UNITED STATES PATENT OFFICE.

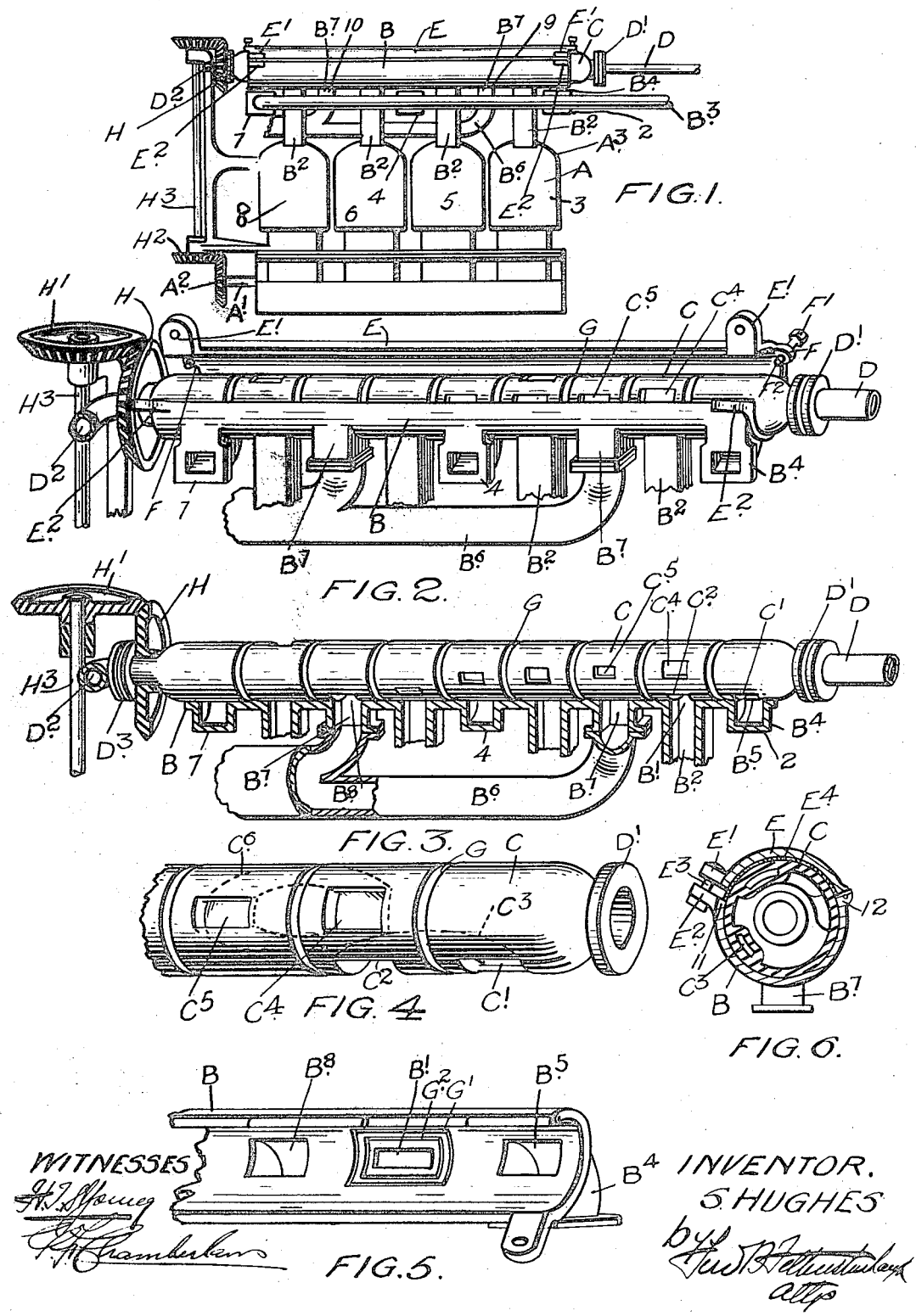

SAMUEL HUGHES, OF LINDSAY, ONTARIO, CANADA.

ROTARY VALVE FOR ENGINES.

1,125,101.

Specification of Letters Patent. Patented Jan. 19, 1915.

Application filed January 4, 1912. Serial No. 669,337.

*To all whom it may concern:*

Be it known that I, SAMUEL HUGHES, of the town of Lindsay, in the county of Victoria, in the Province of Ontario, Canada, have invented certain new and useful Improvements in Rotary Valves for Engines, of which the following is the specification.

My invention relates to improvements in rotary valves for engines and the object of the invention is to devise a simple rotary valve particularly adapted for gasolene engines in which friction, noise, wear and number of parts are reduced to a minimum, which may be simply and effectually lubricated, in which overheating is obviated and in which any wear is readily taken up, and it consists essentially of a bed formed by a segment of a cylinder having gas inlet and exhaust port openings, a cylindrical valve rotatably held in the bed having ports registering with the inlet and exhaust port openings and openings in the bed leading to the cylinder and communicating channels leading between such ports and the ports registering with the exhaust and inlet port openings, a conduit leading to one end and out of the other end of the rotary valve designed to carry a cooling medium through the center of the valve, a suitable driving gear connection between the valve and the engine shaft, a cap covering the valve and connected to the ends of the segmental bed whereby such ends may be drawn together to take up the wear of the bed and suitably arranged grooves formed in the valve bed designed to prevent the passage of the expanding gases between the bed and the valve as hereinafter more particularly explained by the following specification.

Figure 1, is a side elevation of a four cylinder engine showing my device connected thereto. Fig. 2, is an enlarged perspective detail of a valve showing the covering thereof raised. Fig. 3, is a sectional elevation through Fig. 2 with the covering removed. Fig. 4, is a further enlarged perspective detail of one end of the valve cylinder. Fig. 5, is an enlarged perspective detail of a portion of the bed. Fig. 6, is an enlarged cross sectional view through the valve.

In the drawings like letters of reference indicate corresponding parts in each figure.

A is an engine of any suitable type provided with the usual main shaft $A'$ having a driving gear $A^2$ mounted thereon.

B is the valve bed provided with openings $B'$.

$B^2$ are ducts leading from the openings $B'$ of the bed into each of the cylinders $A^3$ of the engine A.

$B^3$ is the gas inlet supply pipe.

$B^4$ are a series of ducts leading from the gas supply pipe $B^3$ to openings $B^5$ in the valve bed B.

$B^6$ is an exhaust pipe connected by ducts $B^7$ to openings $B^8$ in the valve bed.

C is a rotary valve having inlet ports $C'$ registering with the openings $B^5$ of the bed and the openings $C^2$ registering with the openings $B'$ of the bed.

$C^3$ are channels communicating between the ports $C'$ and $C^2$ (see dotted lines Fig. 4). By this means it will be seen that as the valve C revolves the gas is supplied from the inlet pipe $B^3$ through the ducts $B^4$, openings $B^5$, ports $C'$, channels $C^3$, ports $C^2$, openings $B'$ and duct $B^2$ to the interior of the cylinders $A^3$.

$C^4$ are ports spaced from the ports $C^2$ and $C^5$ are ports designed to register with the ports $B^8$.

$C^6$ are channels (see dotted lines Fig. 4) communicating between the ports $C^4$ and $C^5$. By this means it will be seen that as the valve C continues to revolve and after the explosion has taken place the port $C^4$ is carried into position to register with the port $B'$ and the port $C^5$ is carried into position to register with the port opening $B^8$.

It will be seen that the exhaust gases are carried from the cylinder $A^3$ through the duct $B^2$, port $B'$, port opening $C^4$, channel $C^6$, port $C^5$, port opening $B^8$, duct $B^7$ to the exhaust pipe $B^6$.

It will be seen that the arrangement of ports, port openings and channels is the same for each cylinder but they are so arranged that there are only three inlets required and two exhausts, the inlet 2 for a four cylinder engine supplying the cylinder 3, the inlet 4 suppling the cylinders 5 and 6 and the inlet 7 supplying cylinder 8. By my arrangement also there are only two exhausts required, the exhaust 9 serving the cylinders 3 and 5 and the exhaust 10 serving the cylinders 6 and 8.

D is a duct connected by suitable bushings $D'$ to one end of the tubular valve C. $D^2$ is a duct connected by a suitable bushing $D^3$ at the other end of the rotary valve C. By this means it will be seen that a cooling medium such as air or water is conveyed to the center of the valve for the purpose of cooling the same.

E is a covering for the valve C hinged at one side to the bed B and provided at its other side with lugs E'.

E² are lugs extending from the bed B and E³ are bolts extending through the lugs E' and E² and designed to draw the same together so as to draw the ends 11 and 12 of the valve bed inwardly so as to take up the wear thereof.

It will be understood that the greatest amount of wear takes place at the lowest point in the bed and therefore as the wear increases the valve becomes loose opposite the points 11 and 12. It is, therefore, necessary to draw these points in as above described so as to take up the wear.

E⁴ is a suitable sort of lubricating material inserted between the valve C and the valve covering E.

F are lugs which extend from the ends of the valve covering and through which extend adjusting screws F' provided with ends F² having sockets (not shown) in which balls are rotatably mounted and which are adapted to extend from the valve covering E when in its closed position and bear upon the rotary valve C thereby serving to hold it down in place in the bed.

To prevent the ignited gases from passing through between the valve C and the valve bed B I provide annular grooves G extending around the valve C thereby serving to insulate the inlet ports from the passages B² leading to the engine except when they are directly connected by means of the channels C³. I also provide surrounding grooves or channels G' and G² extending around the openings B' thereby further serving to insulate such openings to prevent the ignited gases passing between the valve and the bed to the inlet.

To rotate the valve cylinder I provide a bevel gear H mounted on one end thereof and suitable connecting gears H' and H² mounted on a vertical shaft H³ whereby the gear H is connected to the gear A² mounted on the main shaft A of the engine. Although I use this form of drive connection between the main shaft and the rotary valve, of course, it will be understood that any other form of drive connection may be employed. The bushings D' and D³ which connect the ducts D and D² to the rotary valve C may be of any suitable form which will allow of the rotary movement of the valve independently of the stationary ducts D and D².

From this description it will be seen that I have devised a very simple form of rotary valve particularly adapted for gasolene engines in which all friction, noise and wear is reduced to a minimum and in which all the parts are simply and effectually lubricated.

What I claim as my invention is.

1. In a rotary valve, the combination with a valve cylinder having inlet and exhaust openings, of a bed provided with inlet and exhaust openings adapted to register with the opening of said cylinder and an opening leading to the engine cylinder and internal grooves extending completely around the edges of the opening in the valve bed leading to the valve cylinder, as and for the purpose specified.

2. In a rotary valve, the combination with the segmental cylindrical bed, of a rotary valve held within the bed, a cover for said valve and a semi-cylindrical covering of lubricating material extending around the cylindrical valve from end to end thereof between the valve and said cover, as and for the purpose specified.

3. In a rotary valve, the combination with the valve cylinder having radial inlet and exhaust openings through the side walls thereof, of a valve bed provided with radial inlet and exhaust openings through the side walls thereof adapted to register with said first mentioned openings, and an opening leading to the engine cylinder, and internal grooves extending around the ports to the cylinder in the valve bed.

SAMUEL HUGHES.

Witnesses:
H. Preston,
M. Egan.